United States Patent Office 3,067,036
Patented Dec. 4, 1962

3,067,036
GELATIN DESSERT COMPOSITION AND METHOD OF PREPARING THE SAME
Nicholas D. Pintauro, New City, and Bertrand J. Hall, Croton-on-Hudson, N.Y., assignors to General Foods Corporation, White Plains, N.Y., a corporation of Delaware
No Drawing. Filed Dec. 14, 1959, Ser. No. 859,088
14 Claims. (Cl. 99—130)

This invention relates to a gelatin composition and more particularly to a gelatin composition adapted to be used as a dessert.

As is well known to those skilled-in-the-art, gelatin desserts as heretofore commonly prepared, may contain gelatin, sugar, flavor, color, etc. Most commonly these desserts also contain acids or buffer materials to adjust the taste, tartness, and pH. Although buffer materials are commonly employed, it has been found that the desired results may be more conveniently obtained by use of certain acids.

Formulation of gelatin desserts primarily includes adding these several ingredients to a mixer and mixing to obtain a uniformly homogeneous mixture. The so-mixed composition may then be packaged for distribution.

Among the probelms which have troubled the formulators of gelatin desserts may be noted stratification and agglomeration. Stratification occurs primary because of the inability to obtain a homogeneously distributed mixture of the variously sized particles in the mixture. During mixing, handling, packaging, and even after packaging, it is found that various ingredients are not homogeneously mixed. Certain ingredients readily become segregated from the main body of ingredients and thus the product in non-homogeneous. Because of this non-uniformity, it is not possible to compound gelatin desserts which are uniform batch to batch, in different portions of the same batch, or from package to package, with respect to tartness, gel strength, etc.; and accordingly the product may be inferior.

Agglomeration, which may occur either immediately after mixing the ingredients or in the package (with subsequent caking), includes the cohering together of particles to form larger lumps. This effect, which may be increased by the presence of large amounts of moisture, results in handling difficulties which render the product less than satisfactory.

As a result of stratification, there will be certain portions of the mixture which will, e.g., contain small amounts of acid and other portions which will contain large amounts of acid. The latter portions are particularly conducive to agglomeration; and thus in many respects agglomeration and stratification may be considered as equivalent—at least it may be said that stratification is a contributing cause of agglomeration.

It has been heretofore found that this problem may be considerably minimized if the ingredients of a mixture such as the gelatin dessert mixture are specified to be of the same particle size. Accordingly those skilled-in-the-art, on the basis of experience and theoretical considerations, have commonly specified that all the components of the mixture be of the same particle size. That this is the case may readily be determined from inspection of numerous publications. For example, Lacey (Theory of Particle Mixing, J. Appl. Chem., 4, May 1954, pp. 257–268) points out that, with respect to multi-sized particles, "in practice a completely random distribution of multi-sized particles can never be achieved however long mixing is continued, owing to the tendency of the small particle to pack into the voids between the larger ones." He further points out, with respect to particles of uniform size, that "the best that can even theoretically be produced by stirring is complete randomness."

Perry (Chemical Engineering Handbook, Second Edition, 1941, p. 1541), in discussing particle size, points out that in the mixing of solids "the finer particles always tend to filter down through the coarser ones and seek the bottom." These teachings and others have given support to the proposition that most effective mixing is obtained when the particles being mixed are all the same particle size.

It thus appears that if the gelatin, the sugar, the buffer salts, the acids, etc. are all of substantially the same particle size, stratification may be substantially eliminated and agglomeration decreased considerably. Accordingly it has become common practice in the gelatin dessert formulating industry to specify a rather narrowly defined particle size range within which the gelatin, the sugar, the buffer salts, the acid, etc. must fall.

However, even when those rigid specifications have been met (and this has been a necessarily implicit framework within which prior studies have been made) it was found that the problem has not been completely satisfactorily solved. It was felt that the failure to solve the problem was due to the particular acid which had been tried— commonly citric acid. Citric acid-containing-gelatin desserts are found to agglomerate and cake after moderate periods of exposure to the atmosphere with the result that the shelf-life of such products is economically too short. Although this has been remedied somewhat by narrowing the particle size specifications, the defect is still present.

In an attempt to remedy this defect, particularly as it has been recognized in the case of citric acid-containing gelatin desserts, various other acidulents have been tried, including tartaric acid, malic acid, fumaric acid, as well as many others. In each instance, the acid has been classified to the specified particle size prior to mixing with the other ingredients so that each of the ingredients was of substantially the same particle size. The formulation was then made up and tested for stratification and agglomeration; but no significant improvement was noted with respect to stratification and agglomeration.

Finally, Ferguson, in U.S.P. 2,657,996, disclosed the use of adipic acid in gelatin compositions. As there noted, the use of adipic acid permits attainment of outstanding results; particularly a saving in the amount of gelatin; an extension in the storage time or shelf-life of the dessert mixture; and a considerable decrease in the amount of stratification and agglomeration of the components of the dessert mixture. Furthermore, use of adipic acid is found to permit attainment of products having substantially decreased setting time.

The elimination of stratification in the Ferguson patent is said to be due (column 2, lines 5–11) to the fact that he is able to eliminate a very small amount of finely pulverized buffer; and thus he has a smaller number of components of more uniform particle size in his mixture. Presence of one less ingredient necessarily implies greater facility of obtaining randomness. The elimination of agglomeration to which Ferguson refers is not said to be due to the fact that he has eliminated stratification of the acid, but to the fact that he has eliminated the highly hygroscopic citric acid from the dessert mixture.

In the practice of the invention disclosed in the Ferguson patent, at least insofar as it is related to the production of the more-or-less standard gelatin-like desserts, it was believed (i.e., since the patent issued in 1953) that attainment of these advantages, or at least the maximum realization of these features, could only be obtained if the various components of the mixture (i.e., principally the gelatin, the sugar, and the adipic acid)

were present under conditions such that each had substantially the same particle size or particle size distribution. It was believed, based upon general knowledge and experience in the dessert formulating industry, that if the acid component, for example, did not have substantially the same particle size as did the other components, principally the gelatin and sugar, stratification, agglomeration, and classification would be undesirably obtained before, during, and after packaging with the result that different packages would not possess uniform composition and that even a given package might possess a non-homogeneous composition (which would increase the susceptibility to agglomeration).

Accordingly it has been the practice of those who have considered using adipic acid in gelatin desserts to rigorously specify that the particle size of this material be within a narrow range. As far as can be determined, those skilled-in-the-art of formulating gelatin desserts have not considered that it would be possible to use adipic acid of non-specified particle sizes: but rather, the thinking has been to use classified adipic acid (in the manner heretofore used) and to hope to gain some improvement on this basis by following the teaching of the Ferguson patent.

More specifically, it was thought necessary to specify the particle size of the adipic acid as: not more than about 1% on 40-mesh and not more than about 20% through 100-mesh, thus restricting the particle size distribution to a narrow range and minimizing the proportion of fines present in this material. With such a narrow raw material specification, it would be possible to obtain a product mixture almost completely characterized by this particular size specification, i.e., the entire product mixture was such that about 1% would be retained on 40-mesh and about 20% thereof would pass through 100-mesh.

It may be noted that although adipic acid has been known chemically for many years, its commercial production only dates back to about 1935. Substantially the entire output of adipic acid from that time has been used in chemical uses, most commonly in the manufacture of nylon type materials and secondarily in the manufacture of esters for use in, e.g., plastics, etc. To this day the use of adipic acid in "physical" non-chemical uses, and, in particular, in foods is minimal. Accordingly, very little has been known about the practical everyday physical properties of adipic acid, or more accurately about its handleability.

Furthermore it may be noted that although the use of adipic acid in gelatin desserts was disclosed in the Ferguson patent in 1953, there has yet been no substantial commercial use of adipic acid in such products. Although citric acid does have the above-mentioned serious disadvantages, it is suitable from a number of other points including acidity, pH, tartness, cost, availability, etc. Furthermore, early preliminary tests had indicated that certain adipic acid-gelatin desserts did not possess a satisfactory consumer acceptance; and accordingly there was little continuing interest in this combination. Also the matter of the toxicity of adipic acid with respect to food was not successfully resolved until as late as about 1953, although informally, it might have been considered non-toxic at an earlier date.

Accordingly, in attempting to reduce the invention of the Ferguson patent to commercial reality, detailed studies of adipic acid-gelatin combinations were made. Attempts were made to obtain commercial, screened adipic acid of desired uniform particle size. The uniformity and size specifications which were given to the manufacturers were based on experience with earlier used acids, including citric acid. The manufacturer took freshly prepared adipic acid, classified it to a uniform specified particle size specification, bagged it, and forwarded it to the formulator, who stored it for 10–14 days and then subjected the acid to screen analysis prior to use.

This essentially duplicates conditions of normal operation, wherein a producer of adipic acid, who was making this material in large quantities for the purpose of passing it along to a gelatin dessert formulator, may classify the freshly produced adipic acid to meet the desired uniform particle size specification, draw off the unsuitably sized acid, and place the specification acid in bags or other containers substantially immediately. These containers may be stored at the point of production; and they may typically be forwarded to the formulator within a few days, e.g., 4–5 days.

The adipic acid received by the formulator may be stored in the carrier for an additional day or so and then passed into a storage warehouse wherein it will become a portion of the large inventory. Here it may remain for at least about 10 days to two weeks and commonly much longer. At the end of the storage period, just prior to use, the acid may be subjected to a screen analysis to ascertain that it meets the particle size specifications.

It was found, unexpectedly, that the previously screened material, which had been stored for this period, no longer met the specifications—more specifically, it was now randomly sized and had a large proportion of fines. Accordingly, this material was rejected as unsatisfactory. On further study, it became apparent that the material which met the specifications at the manufacturer's plant, was non-specification material at the point of use, despite the fact that the handling of the acid had been rather mild and insufficient to create the changes noted.

Although it is not possible to state precisely why this phenomenon occurs, it appears that when adipic acid crystals are freshly prepared, they may be characterized by some internal strain, possibly of an electrostatic nature. Because of this, even when stored under controlled equilibrium condition at constant temperature, constant humidity, etc., freshly prepared adipic acid crystals undergo a radical internal change; and as a result of this completeunexpected phenomenon adipic acid crystals, after a very brief period of time, disintegrate, shatter, deaggregate, deagglomerate, etc., and the average particle size of the adipic acid crystals decreases considerably in a matter of days. Under plant conditions wherein adipic acid may be stored in packages or in open containers, this crystal or particle deterioration may occur even more quickly.

Accordingly, it has been believed necessary for the user to reclassify adipic acid immediately prior to use. These screening operations are expensive, time-consuming, and inefficient. Furthermore, they produce a disproportionately large amount of fines which may be as high as 80% of the adipic acid charge. This classified material must be recirculated or reused in some manner other than for production of the desired gelatin dessert product, and this would involve considerable handling expense and/or loss of a large proportion of otherwise useable material.

It is an object of this invention to provide a gelatin-type dessert characterized by use of adipic acid which permits attainment of high degree of uniformity and homogeneity with respect to composition. It is another object of this invention to provide a product characterized by freedom from stratification and resulting agglomeration. It is another object of this invention to disclose a technique for making such a product which permits the use of adipic acid having a substantially different particle size distribution from that which has heretofore been thought to be possible. Other objects of this invention will be apparent to those skilled-in-the-art on inspection of the following description.

In accordance with this invention, a dessert-forming composition characterized by the above-mentioned desiderata may be prepared by mixing together particles of gelatin and particles of adipic acid which have a particle size different from the particle size of the gelatin.

Gelatin, as the term is used herein, includes any of the gelatins commonly employed in the food industry, including those used in the preparation of gelatin desserts. Such a gelatin may be an acid or a lime gelatin and may commonly have a bloom of 100–285, typically 200; a viscosity of 20–65, typically 35 millipoises; and a moisture content of 8%–12%. Such a gelatin as commonly prepared and delivered to, e.g., a dessert formulating plant may have a more-or-less uniform particle size such that about 100% will pass through 40-mesh and 20% will pass through 100-mesh. In other words, at least a majority and commonly about 80% or more of the particles of gelatin will have an average diameter of about from 0.42 mm. to 0.15 mm. Commonly such a gelatin may be thought of as containing a plurality of substantially uniformly sized particles, and in particular, it will be free of very large and very fine particles.

In the preparation of gelatin desserts including those which are typified by the product of the instant invention, the gelatin may be present in amount of about 7%–12%, typically 9% of the total formulation.

Adipic acid as used in accordance with this invention is the standard adipic acid of commerce subject to the requirements hereinafter set forth. As commonly obtained at the point of production, adipic acid may be in the form of more-or-less whitish, translucent, clear-looking crystals; and these crystals as usually delivered from a point of production may have been classified to a size distribution identical to that hereinbefore noted for the gelatin, i.e., 100% through 40-mesh and 20% through 100-mesh.

In accordance with this invention it has been found that it is unnecessary to classify these particles; and that the advantages heretofore thought only to be attainable by use of a rigorously classified material can be attained, when adipic acid is used without classification.

The distribution of particle sizes of the adipic acid which may be employed in practice of this invention may be random: e.g., statistical, equilibrium, or non-uniform. A statistical distribution may be one wherein the number of particles of intermediate size is largest and the number of particles of smaller and larger sizes decreases as the size differs from the mean size. An equilibrium distribution of particle sizes is one obtained by stabilization as hereinafter defined. A non-uniform distribution, as the term is used in this specification, includes a particle size distribution where all the particles are not of the same size and the distribution does not correspond to a statistical distribution or to an equilibrium distribution.

In practice of the invention according to its preferred embodiment, it is preferred to use adipic acid crystals which have an equilibrium particle size distribution obtained by stabilization. Stabilization, as the term is used herein, includes maintaining freshly produced crystals of adipic acid in storage for a period which may commonly be at least 2 and preferably 5–7 days or longer, until all those changes which will occur have occurred. During this stabilization period, the freshly produced crystals disintegrate, disagglomerate, disaggregate, explode, fracture, etc., thereby relieving what appear to be internal stresses within the crystals. The resulting mixture may be characterized by a much less uniform particle size. The particle size distribution of the stabilized adipic acid crystals may be generally described as equilibruim and, as this term is used herein, it includes particle size distributions which are different from those which the mixture originally possessed and more specifically, it refers to one which is stabilized (by time) against substantial further change on standing. In one instance, for example, the stabilized material which originally had a particle size distribution of 100% through 40-mesh and 20% through 100-mesh was found to have stabilized itself into a mixture wherein 100% of the particles passed through 40-mesh; and 65%–90% passed through 100-mesh.

In a specific embodiment of this invention, adipic aid was employed which had a particle size distribution which was the equilibrium particle size distribution. This was obtained by taking freshly prepared commercial adipic acid crystals and permitting them to stand for seven days under normal atmospheric conditions. The particle size distribution of the unstabilized and the stabilized adipic acid will be as follows:

| Screen Size-Mesh | Unstabilized, percent | Stabilized, percent |
|---|---|---|
| On 40 | 0.4 | 0.2 |
| 80 | 19.5 | 21.1 |
| 100 | 62.4 | 12.0 |
| 140 | 1.3 | 22.2 |
| 200 | 5.4 | 30.7 |
| In pan | 11 | 13.4 |
| | 100.0 | 99.60 |

It will be noted that the unstabilized adipic acid was of a uniform size in that appreciable percentages of material fell over a wide range of particle sizes and also in that the amounts of materials on each of the screens was different from the amounts on any other screen. In the stabilized material, it will be noted that there was a much larger amount of fines, i.e., 66.3% through 100-mesh (as against 17.7% for the unstabilized) and further that the distribution was more even, i.e., the percentages of material on the various screens is about the same. It may be noted that a similar distribution of stabilized material is obtained even if the unstabilized material be classified so that originally e.g. 100% is through 80-mesh and 100% is on 100-mesh.

In another embodiment of this invention, adipic acid was employed which had a statistical particle size distribution as follows.

Screen size-mesh: Percent
- On 40 _____ 1
- 80 _____ 5
- 100 _____ 40
- 140 _____ 42
- 200 _____ 9
- In pan _____ 3

100

It will be apparent to those skilled-in-the-art that the percentages of particles which fall within the particular ranges may vary and still retain the more-or-less random statistical distribution.

In still another embodiment of this invention, adipic acid can be employed which had a non-uniform particle size, i.e., one which is neither a random statistical distribution nor an equilibrium distribution, e.g.—

Screen size-mesh: Percent
- On 40 _____ 20
- 80 _____ 5
- 100 _____ 50
- 140 _____ 5
- 200 _____ 10
- In pan _____ 10

100

In accordance with the preferred embodiment of this invention, the amount of particles of adipic acid added to the product may be from 1.6%–3.2%, commonly 2.8%; it is found that use of this amount of adipic acid permits attainment of the preferred pH of about 4.4–3.6, typically 4.0.

In the preferred embodiment of this invention, the gelatin-forming composition may contain a dispersant, and preferably this dispersant will simultaneously be employed as a flavor and a sweetening agent. Most commonly the dispersant may be a soluble sugar and typically it may be sucrose.

Although the particle size of the adipic acid which is used may unexpectedly be varied as hereinbefore noted, it is found that the resulting dessert composition is free of stratification with accompanying agglomeration even under the most unfavorable conditions.

More specifically the dispersant will be present in the form of a plurality of particles which possess substantially the same particle size and particle size distribution as the particles of gelatin. Commonly this may be done by using a fine granular sugar having a particle size distribution such that 100% passes through 40-mesh, 20% passes through 100-mesh.

Although the amount of sugar in the dessert-forming composition may vary, commonly it may be present in amount corresponding to about 70%–90%, say 85% of the total product weight.

In the preferred embodiment of this invention, the composition may also contain coloring and flavoring, typically about 0.35% of each. The product of this invention may be formulated by mixing together the various ingredients, including the gelatin, the adipic acid, and the sugar—as well as the flavor, color, buffer, and salt when the latter are used. Such a mixing may, for example, be effected in a drum or in any suitable mixing device.

*Example 1*

In accordance with one specific example of this invention, the following materials were mixed together in a drum mixer.

| Ingredient: | Percent |
| --- | --- |
| Adipic acid—Stored for 10 days at 60° F. in a closed container and having a particle size distribution as hereinbefore tabulated as "stabilized" | 2.8 |
| Gelatin—200 Bloom, 35 M.P. (20% through 100, 80% on 100-mesh) | 9 |
| Dispersant—Sucrose (20% through 100-mesh) | 88.04 |
| Flavor—Natural and artificial raspberry flavor | 0.37 |
| Sodium chloride | 0.25 |
| Color—Raspberry color | 0.34 |
| | 100.00 |

*Example 2*

| Ingredient: | Percent |
| --- | --- |
| Adipic acid (having a statistical particle size distribution as hereinbefore set forth) | 3 |
| Gelatin (particle size as Example 1) | 12 |
| Sugar (particle size as Example 1) | 84.31 |
| Flavor—Natural and artificial flavor | 0.35 |
| Color—Raspberry color | 0.34 |
| | 100.00 |

*Example 3*

In this example, the same formulation as used in Example 2 was employed except that the gelatin contained the flavor encapsulated therein. Although such a gelatin flavor encapsulation might be prepared by various techniques, it was prepared by drying the gelatin flavor combination in accordance with the technique disclosed in U.S.P. 2,369,847.

On testing, it was found that the gelatin compositions prepared by each of the above-mentioned examples was characterized by substantially no stratification or agglomeration either during mixing or during storage within the package. Each of the stored packages was found to contain therewithin material of constant and uniform composition and the contents of each package were substantially homogeneous.

It is particularly unexpected and highly surprising to those skilled-in-the-art that the desirable results hereinbefore set forth could be obtained by (*a*) use of adipic acid of particle size different from the particle size of the other components of the mixture, and (*b*) by use of adipic acid having a random or wide particle size distribution.

Although this invention has been described with reference to certain specific embodiments, it will be apparent to those skilled-in-the-art that various modifications and changes may be made thereto.

What is claimed is:

1. An edible dessert-forming composition characterized by increased storage life, high degree of uniformity and homogeneity with respect to composition, and freedom from stratification and agglomeration on storage which comprises particles of gelatin and particles of adipic acid which have a particle size different from the particle size of the gelatin.

2. An edible dessert-forming composition as claimed in claim 1 wherein the adipic acid particles have a statistical particle size distribution.

3. An edible dessert forming composition as claimed in claim 1 wherein the adipic acid particles have a non-uniform particle size distribution.

4. An edible dessert-forming composition as claimed in claim 1 wherein the adipic acid particles have an equilibrium particle size distribution.

5. An edible dessert-forming composition as claimed in claim 4 wherein said equilibrium particle size distribution is obtained by stabilization of adipic acid particles.

6. An edible dessert-forming composition as claimed in claim 5 wherein stabilization is effected by maintaining adipic acid particles for a period of time until the particle size distribution remains constant with additional storage.

7. An edible dessert-forming composition characterized by increased storage life, high degree of uniformity and homogeneity with respect to composition, and freedom from stratification and agglomeration on storage which comprises particles of gelatin of substantially uniform particle size and particles of adipic acid which have a particle size different from the particle size of the gelatin.

8. An edible dessert-forming composition characterized by increased storage life, high degree of uniformity and homogeneity with respect to composition, and freedom from stratification and agglomeration on storage which comprises particles of gelatin of substantially uniform particle size, particles of a dispersant of substantially the same uniform particle size, and particles of adipic acid which have a particle size different from the particle size of the gelatin.

9. An edible dessert-forming composition characterized by increased storage life, high degree of uniformity and homogeneity with respect to composition, and freedom from stratification and agglomeration on storage which comprises particles of gelatin having a particle size such that about 100% will pass through a 40-mesh screen and about 20% will pass through a 100-mesh screen; and particles of adipic acid which have a particle size different from the particle size of the gelatin.

10. The method of preparing an edible dessert-forming composition characterized by increased storage life, high degree of uniformity and homogeneity with respect to composition, and freedom from stratification and agglomeration on storage which comprises mixing particles of gelatin together with particles of adipic acid which have a particle size different from the particle size of the gelatin.

11. The method claimed in claim 10 wherein the adipic acid particles have a statistical particle size distribution.

12. The method claimed in claim 10 wherein the adipic acid particles have a non-uniform particle size distribution.

13. The method claimed in claim 10 wherein the adipic acid particles have an equilibrium particle size distribution.

14. The method of forming an edible dessert-forming composition characterized by increased storage life, high degree of uniformity and homogeneity with respect to composition and freedom from stratification and agglomeration on storage which comprises stabilizing particles of adipic acid until they remain of unchanged particle size distribution on further storage and mixing said stabilized particles of adipic acid with particles of gelatin, said particles of adipic acid having a particle size different from the particle size of the gelatin.

References Cited in the file of this patent

UNITED STATES PATENTS 2,657,996  Ferguson ---------------- Nov. 3, 1953

FOREIGN PATENTS 369,518  Great Britain ----------- Mar. 24, 1932